Feb. 20, 1951
G. KERSHNER
2,542,817
AUTOMATIC BLOCK REMOVAL MECHANISM
FOR HYDRAULIC BLOCK PRESSES
Filed Dec. 9, 1949
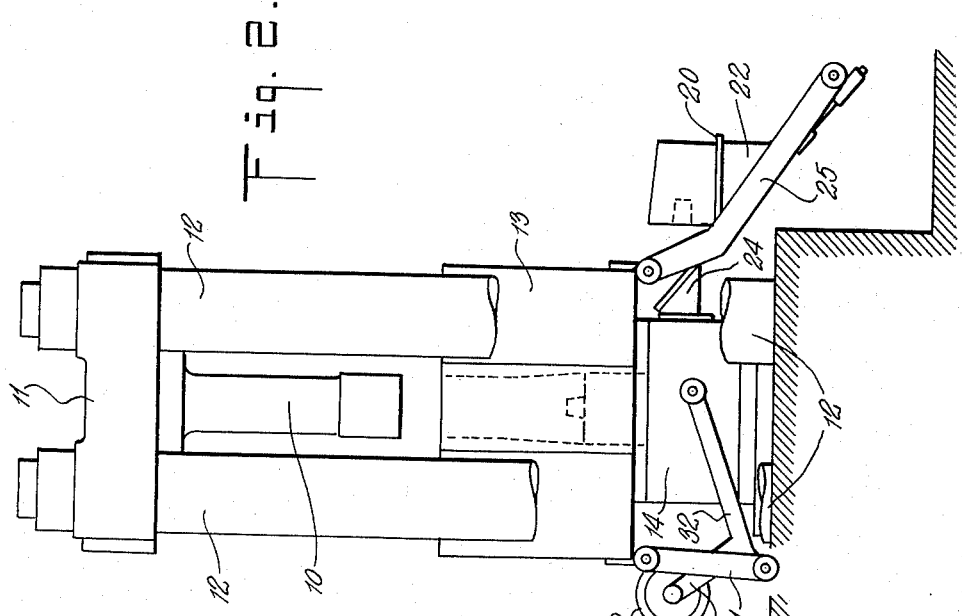
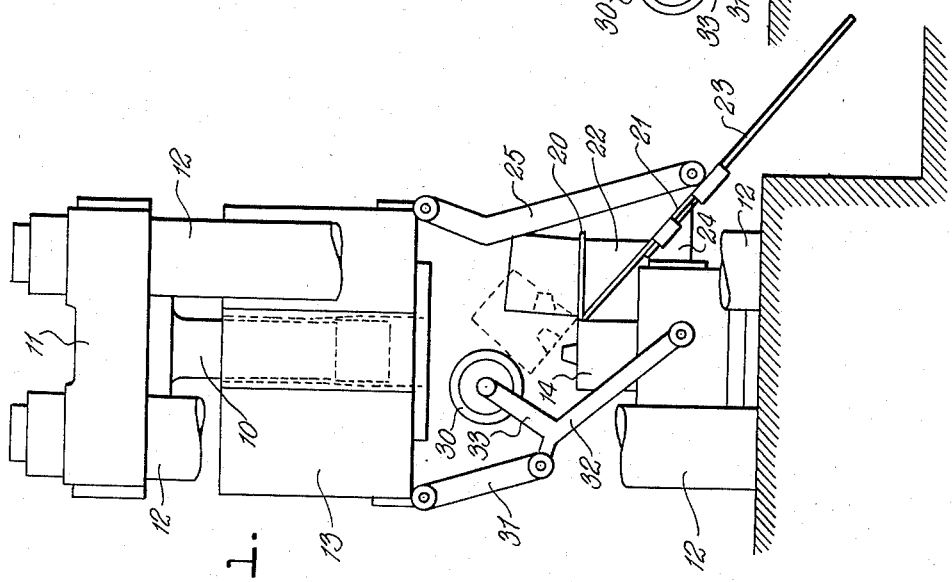
INVENTOR.
GEORGE KERSHNER
BY
Kenyon & Kenyon
HIS ATTORNEYS Patented Feb. 20, 1951

2,542,817

UNITED STATES PATENT OFFICE 2,542,817

AUTOMATIC BLOCK REMOVAL MECHANISM FOR HYDRAULIC BLOCK PRESSES

George Kershner, Hutchinson, Kans., assignor to The Carey Salt Company, Hutchinson, Kans., a corporation of Kansas Application December 9, 1949, Serial No. 132,054

6 Claims. (Cl. 25—120)

This invention relates to an automatic block removal mechanism for an hydraulic block press and more particularly to such a mechanism for use with hydraulic block presses wherein the mold member has a lower closure member and these members are relatively movable vertically along the axis of the mold aperture and separable for removal of the formed block.

This invention is of particular utility in removing automatically-formed blocks of salt or the like from any hydraulic block press having a mold member with a bottom closure member movable vertically along the axis of the mold aperture to remove the formed block from the mold. This invention provides means, preferably in the form of a roller, which automatically engages the side of the formed block as the block clears the mold member and thereafter tips the formed block off the upper surface of the closure member, preferably rolling down the side of the block in so doing. This invention also includes means, preferably in the form of a floating or slidable shelf, which is automatically disposed adjacent the upper surface of the closure member and on the same plane therewith in the path of the formed block as the latter is tipped off the upper surface of the closure member. This invention also comprises means for removing this shelf from the above-mentioned block-receiving position to a suitable delivery or block-discharging position as said closure member and mold member are thereafter moved together into operative position to form another block.

This invention will be understood more fully from the following description taken with the accompanying drawings in which:

Fig. 1 shows in side view an hydraulic press for making salt blocks with the mold body or member in its uppermost position and the main ram or closure member in its lowermost position, illustrating the manner in which the formed salt block is tipped by the roller onto the receiving shelf in the block-receiving position of the latter; and Fig. 2 shows the same press with both the mold body or member and the main ram in their lowermost positions, illustrating the manner in which the receiving shelf is then positioned at a delivery station in its block-discharging position.

In Fig. 1 is shown a side view of an hydraulic press for making salt blocks including a fixed die or plunger 10 supported in a head 11 and which is spaced from and secured to any suitable base by means of a plurality of guide and tension bars 12. A mold box 13 in which is secured the conventional mold or female member is movable vertically along the axis of cooperating die or male member 10 under control of conventional auxiliary or stripper rams (not shown). The mold aperture is preferably shaped as indicated by the dotted lines in Figs. 1 and 2 to produce a salt block of conventional truncopyramidal form, and it will be noted that the mold aperture extends completely through the mold of mold body 13, the upper open end of this aperture being closed during operation by male member or die 10 and the lower end being closed by male member or main ram 14. Main ram 14 is also movable toward and away from fixed die or plunger 10 to achieve this desired closure of mold body 13. On the upper surface of closure member or main ram 14 is disposed a central projection as shown to provide the desired aperture or cavity in the finished formed salt block in order that the block may be mounted on a suitable holder for use in the barnyard or field.

In operation, mold box 13 and main ram 14 are initially both in their lowermost position as shown in Fig. 2, at which time the salt charge is placed, preferably automatically, in the mold cavity or aperture by any suitable means. As described in my Patent No. 1,893,996, mold body 13 and main ram 14 may then be moved upwardly by the application of suitable hydraulic pressure to their respective rams. Their motion is preferably simultaneous but with mold box 13 initially moving at a slightly faster rate so that the upper surface of closure member or main ram 14 is almost free of but still closes the lower open end of the aperture or mold body 13 as die or plunger 10 begins to exert pressure on the salt charge within the mold. The application of hydraulic pressure is then continued to the main ram or closure member 14 so that the latter continues its upward movement with the mold and mold box 13 also moving upwardly but to a lesser extent (either by further application of hydraulic pressure to the auxiliary rams or due to friction between the salt under compression and the walls of the mold) until the salt is compressed to the desired degree and the main ram 14 and plunger 10 have each penetrated the mold to approximately the same depth.

Alternately, as described in my Patent No. 1,461,093, mold box 13 and main ram or closure member 14 may initially move upwardly at the same speed while maintaining their same relative position shown in Fig. 2 with main ram 14 fully inserted in the mold until the salt is compressed to the same desired degree by means of die or plunger 10 entering the mold to the desired depth.

In either case, mold box 13 and the mold fixed therein are next moved upwardly slightly by means of the auxiliary or stripper rams (not shown) and the hydraulic pressure on main ram 14 simultaneously removed so that the latter moves downwardly due to the force of gravity. This slight movement of mold box 13 relative to die or plunger 10 causes the compressed salt block to be forced down out of the mold and remain seated on the upper surface of closure member or main ram 14, moving under the force of gravity thereafter downwardly therewith.

The final movement of the press in its cycle of operation consists in thereafter removing the hydraulic pressure from the auxiliary or stripper rams so that mold box 13 and the contained mold move downwardly under the force of gravity, this operation preferably taking place only after main ram 14 has substantially reached its lower limit, shown in both Figs. 1 and 2. This downward motion of mold box 13 continues until main ram 14 has returned to its fullest closure position within mold box 13 as shown in Fig. 2.

In accordance with this invention the following mechanisms are connected to the above-described hydraulic press for the automatic removal of the salt blocks, which each weigh approximately fifty pounds, to a suitable delivery station removed from the molding area of the press. Such automatic removal is very desirable from a safety standpoint since otherwise the finished block must be removed by hand from atop the main ram 14 after the operating cycle is completed with the attendant danger that inadvertent operation of the press during this removal may cause injury to the operator. Automatic removal of the finished salt block is also of further advantage in that the operating cycle may be speeded up since no additional operating time is required, in accordance with this invention, for the removal of the salt block from atop main ram or closure member 14, this being accomplished during the normal operating cycle with the salt being delivered to a delivery station as shown in Fig. 2, from which it may be removed while the next block is being pressed.

As best seen in Fig. 1 a block-receiving conveyor in the form of a shelf 20 is disposed in block-receiving position so that its upper surface is substantially in alignment with the upper surface of closure member or main ram 14 and with adjacent edges thereof substantially abutting when closure member 14 is in its lowermost position and mold box 13 is in its uppermost position. Shelf 20 is secured to a suitable slide 21 as by means of angle member 22 so that shelf 20 and slide 21 are disposed at an angle as shown. Since the upper surface of main ram or closure member 14 is preferably substantially perpendicular to the axis of die or plunger 10 and the axis of the cooperating mold of mold box 13, this results in slide 21 also being disposed at an angle to the axis of plunger 10 and the aperture of the mold. A slide guide 23 cooperates with slide 21 for slidable movement of the latter therewith and is secured to closure member 14 as by means of angle member 24. To complete the assembly, a linkage 25 shaped as shown is pivotally mounted at its upper end to mold body 13 and at its lower end to slide 21. As mold body 13 moves downwardly from the position shown in Fig. 1 to the position shown in Fig. 2 under the force of gravity during the latter part of its cycle of operation, as described above, slide 21 and shelf 20 are caused to slide along guide 23 and move downwardly and laterally from closure member 14 until shelf 20 comes to rest in the position shown in Fig. 2, which constitutes the delivery station or block-discharging position for the salt block. The salt block may thereafter be removed from this station by an individual or may be automatically conveyed to any suitable removal device, such as a belt, truck or the like.

Cooperating with the removal or floating shelf 20 just described is the mechanism shown at the left of the drawings, which comprises a block-engaging and moving member in the form of a roller 30 whose position is under control of the relative positions of mold box 13 and main ram 14 due to the linkage shown. This linkage comprises a first link 31 pivotally mounted at one end to mold box 13 as shown, and a second link 32 pivotally mounted at one end to main ram or closure member 14 as shown. The other adjacent ends of links 31 and 32 are pivotally joined together and link 32 is provided with an extension 33 adjacent these joined ends, to the free end of which is rotatably mounted roller 30. Roller 30 is made sufficiently long and is proportioned, together with links 31 and 32 and extension 33, such that the circumference of roller 30 just engages the side of the formed salt block when closure member 14 is sufficiently withdrawn from mold box 13 to free the block formed in the mold therefrom. As closure member or main ram 14 thereafter moves further downwardly, roller 30 rolls down the side of the salt block and at the same time revolves about the pivot point of link 32 and closure member 14 so as to tip the formed salt block from the upper surface of closure member 14, as indicated by the dotted lines, causing the formed salt block to fall upon shelf 20, which is in block-receiving position as described above. It is to be noted that the above linkage and roller 30 should be so proportioned that with closure member 14 in its lowermost position and mold box 13 in its uppermost position, as shown in Fig. 1, roller 30 has moved sufficiently to the right to tip the salt block far enough that it must fall upon shelf 20 and cannot return atop closure member 14. Links 31 and 32 should preferably also be so proportioned that their common pivot point must always lie on one side of a line drawn through their end pivot points, as shown in Fig. 1, so that when mold box 13 is thereafter moved downwardly to the position shown in Fig. 2, roller 30 must revolve counterclockwise about the lower pivot point of link 32, coming to rest in the position shown in Fig. 2.

If desired, suitable cushioning may be provided atop shelf 20 to cushion the contact of the salt block therewith. Moreover, the tipping action of this invention due to the rolling contact of the roller 30 with the side of the finished salt block is very gentle. Thus there is no danger of damage to the formed salt block during the automatic removal operation.

While it has not been feasible to indicate this feature in the drawings, both the linkage of roller 30 and of slide 21 are adjustable to allow proper adjustment for exact timing of the salt block removal cycle. Furthermore, once this adjustment has been made it is impossible to have a premature or delayed action of the block removal mechanism since the parts thereof are attached to the moving parts of the hydraulic press and are governed entirely by the relative movement of the block-forming parts, e. g., mold box 13 and closure member or main ram 14. The removal mechanism is thus entirely automatic and positive in its action.

While the automatic block removal mechanism of this invention has been shown applied to a specific hydraulic press, it is obvious that it can be employed with any hydraulic-forming press, including a mold having a block-forming aperture with an open lower end and a closure member therefor mounted for relative movement along the axis of the aperture to open and close this lower end, providing, of course, there is sufficient clearance to accommodate the removal mechanism.

What is claimed is:

1. In an hydraulic block-forming press comprising means for molding and supporting a mold block in position for removal after molding including a pair of vertically separable molding members which are in open position when the block is in position for removal, means for removing the block from said position for removal comprising a block-engaging member, means for supporting and moving said block-engaging member between a position which is out of the molding member line of movement when the molding members are closed and a block-moving position when the molding members are open and the block is supported in position for removal, said means for supporting and moving said block-engaging member comprising a pair of links pivoted together and with the free end of one pivoted to one molding member and the free end of the other pivoted to the other molding member and on which said block-engaging member is carried at a point spaced from their free ends, whereby said block-engaging member is carried away from said molding members upon their closing and into block-moving position upon their opening, and a block-receiving conveyor mounted to a movable molding member of said press for movement from block-receiving position adjacent the means for supporting the block in position for removal when the molding members are in open position to a block-discharging position when said molding members are in closed position.

2. In an hydraulic block-forming press comprising means for molding and supporting a mold block in position for removal after molding including a pair of vertically separable molding members which are in open position when the block is in position for removal, means for removing the block from said position for removal comprising a block-engaging member, means for supporting and moving said block-engaging member between a position which is out of the molding member line of movement when the molding members are closed and a block-moving position when the molding members are open and the block is supported in position for removal, said means for supporting and moving said block-engaging member comprising a pair of links pivoted together and with the free end of one pivoted to one molding member and the free end of the other pivoted to the other molding member and on which said block-engaging member is carried at a point spaced from their free ends, whereby said block-engaging member is carried away from said molding members upon their closing and into block-moving position upon their opening, and a block-receiving conveyor, means for supporting and guiding said conveyor from block-receiving position adjacent the means for supporting the block in position for removal when the molding members are in open position and to block-discharging position out of the line of the molding member line of movement when the molding members are in closed position, and a link pivotally connected to said conveyor at one end and to a movable molding member of said press at its other end and of a length to move said conveyor to its block-receiving position when said press molding members are open and to move said conveyor to its block-discharging position when the molding members are in closed position.

3. In an hydraulic block-forming press comprising means for molding and supporting a mold block in position for removal after molding including a pair of vertically separable molding members which are in open position when the block is in position for removal, means for removing the block from said position for removal comprising a block-engaging member, means for supporting and moving said block-engaging member between a position which is out of the molding member line of movement when the molding members are closed and a block-moving position when the molding members are open and the block is supported in position for removal, said means for supporting and moving said block-engaging member comprising a pair of links pivoted together and with the free end of one pivoted to one molding member and the free end of the other pivoted to the other molding member and on which said block-engaging member is carried at a point spaced from their free ends, whereby said block-engaging member is carried away from said molding members upon their closing and into block-moving position upon their opening, and a block-receiving conveyor and means for supporting and guiding said conveyor for slidable movement at an angle to the line of vertical movement of said separable molding members from block-receiving position adjacent the means for supporting the block in position for removal when the molding members are in open position and to block-discharging position out of the line of the molding member line of movement when the molding members are in closed position.

4. In an hydraulic block-forming press comprising means for molding and supporting a mold block in position for removal after molding including a pair of vertically separable molding members which are in open position when the block is in position for removal, means for removing the block from said position for removal comprising a block-engaging member in the form of a roller, means for supporting and moving said roller between a position which is out of the molding member line of movement when the molding members are closed and a block-moving position when the molding members are open and the block is supported in position for removal, said means for supporting and moving said roller comprising a pair of links pivoted together and with the free end of one pivoted to one molding member and the free end of the other pivoted to the other molding member and on which said roller is carried at a point spaced from their free ends, whereby said roller is carried away from said molding members upon their closing and into block-moving position upon their opening, and a block-receiving conveyor mounted to a movable molding member of said press for movement from block-receiving position adjacent the means for supporting the block in position for removal when the molding members are in open position to a block-discharging position when said molding members are in closed position.

5. In an hydraulic block-forming press comprising means for molding and supporting a mold block in position for removal after molding including a pair of vertically separable molding members which are in open position when the block is in position for removal, means for removing the block from said position for removal comprising a block-engaging member, means for supporting and moving said block-engaging member between a position which is out of the molding member line of movement when the molding members are closed and a block-moving position when the molding members are open and the block is supported in position for removal, said means for supporting and moving said block-engaging member comprising a pair of links pivoted together and with the free end of one pivoted to one molding member and the free end of the other pivoted to the other molding member and on which said block-engaging member is carried at a point spaced from their free ends, whereby said block-engaging member is carried away from said molding members upon their closing and into block-moving position upon their opening.

6. In an hydraulic block-forming press comprising means for molding and supporting a mold block in position for removal after molding including a pair of vertically separable molding members which are in open position when the block is in position for removal, means for removing the block from said position for removal comprising a block-engaging member in the form of a roller, means for supporting and moving said roller between a position which is out of the molding member line of movement when the molding members are closed and a block-moving position when the molding members are open and the block is supported in position for removal, said means for supporting and moving said roller comprising a pair of links pivoted together and with the free end of one pivoted to one molding member and the free end of the other pivoted to the other molding member and on which said roller is carried at a point spaced from their free ends, whereby said roller is carried away from said molding members upon their closing and into block-moving position upon their opening.

GEORGE KERSHNER.

REFERENCES CITED

The following references are of record in the file of this patent:

UNITED STATES PATENTS

| Number | Name | Date |
| --- | --- | --- |
| 1,793,089 | Heyes | Feb. 17, 1931 |
| 2,314,120 | Braun | Mar. 16, 1943 |